Sept. 22, 1964 W. K. ENGLISH 3,150,354

MAGNETIC-CORE DECODING DEVICE

Filed Nov. 17, 1960 3 Sheets-Sheet 1

INVENTOR.
WILLIAM K. ENGLISH

BY Lyon & Lyon

ATTORNEYS

Sept. 22, 1964 W. K. ENGLISH 3,150,354

MAGNETIC-CORE DECODING DEVICE

Filed Nov. 17, 1960 3 Sheets-Sheet 2

INVENTOR.
WILLIAM K. ENGLISH
BY Lyon & Lyon
ATTORNEYS

MAGNETIC-CORE DECODING DEVICE

Filed Nov. 17, 1960 3 Sheets-Sheet 3

INVENTOR.
WILLIAM K. ENGLISH
BY Lyon & Lyon
ATTORNEYS

United States Patent Office 3,150,354
Patented Sept. 22, 1964

3,150,354

MAGNETIC-CORE DECODING DEVICE

William K. English, Menlo Park, Calif., assignor to AMP Incorporated, Harrisburg, Pa., a corporation of New Jersey Filed Nov. 17, 1960, Ser. No. 69,916
9 Claims. (Cl. 340—174)

This invention relates to circuits including magnetic cores and, more particularly, to an improved decoding circuit employing multiaperture magnetic cores.

An object of this invention is to provide a novel decoding circuit employing magnetic cores.

Another object of this invention is the provision of an improved circuit arrangement employing magnetic cores for selectively energizing one of a plurality of outputs in response to a code pattern input.

Still another object of the present invention is the provision of a novel, simple, and useful decoding-tree arrangement.

These and other objects of the invention are achieved in a circuit which employs multiaperture cores of the type which can have two states of magnetic remanence, one of which is called a set state and the other a clear state. These cores are arranged in successive groups such that the number of cores in each group is related to the number of cores in the preceding group. These cores have input apertures and transmit apertures. The transmit aperture of each core is coupled to the input aperture of a different core in a succeeding group. A first core in a first one of said successive groups is driven to its first or set state of remanence. The magnetic material around one of the transmit apertures of this first core is primed, and a drive is applied to this first core to return it to its initial or clear state of remanence. As a result, the magnetic core in the succeeding group which is coupled to the transmit aperture which has been primed will be driven toward its first state of magnetic remanence. None of the other cores will be driven in response to the drive applied to the core in the first group, since none of the other transmit apertures of the first group core have been primed.

In the manner just described, the state of remanence of the initial or first core in the first group is transferred to a core in each successive group by successive priming and then driving. While the drive is simultaneously applied to all the cores in a given group, the priming is selectively applied to one of the priming windings in each group, in accordance with a predetermined pattern. An output is derived from a transmit aperture of one of the plurality of cores in the last of the groups. The location of this output is determined by the pattern of the priming energizations which have been applied to the plurality of transmit apertures in each of the core groups.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
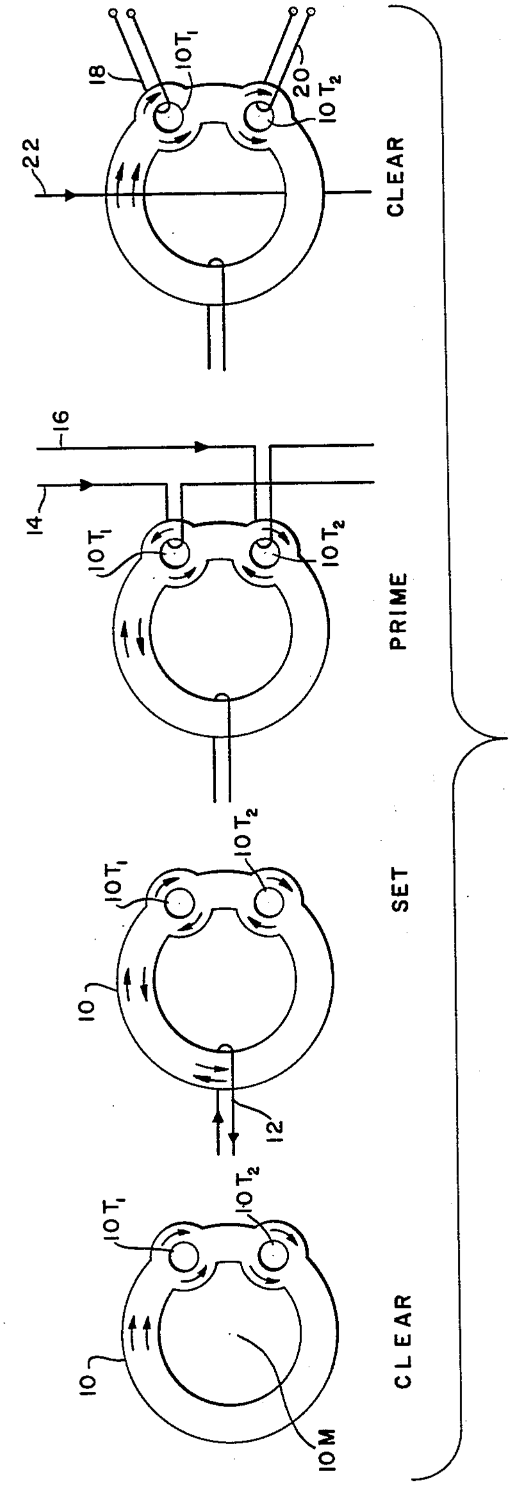
FIGURE 1 is a schematic drawing, shown to assist in an understanding of this invention and to illustrate what occurs with priming of a core.

Reference is now made to FIGURE 1, which shows a magnetic core of a multiaperture type in four flux states to which the core is driven in accordance with this invention. The core 10 has a main aperture 10M, which here serves as the input aperture, and two transmit apertures $10T_1$ and $10T_2$. The arrows drawn on the core 10 represent flux lines. Let it be assumed that when the core 10 is in the clear state, the flux lines throughout the core circulate in a clockwise direction. Thus, the arrows including those adjacent the transmit apertures $10T_1$ and $10T_2$ represent the flux going in a clockwise direction.

Assume now that by means of a drive winding 12 and current applied thereto the core 10 is set. By that is meant that the flux in the portion of the core closest to the main aperture 10M now circulates in a counterclockwise direction, while the flux in the outer portion of the core 10 circulates in a clockwise direction. Such flux distribution in the core can be achieved in a number of known ways. Amongst these are providing a suitable load on a transmit aperture, controlling the ampere turns of the winding 12 so that the flux throughout the core is not completely reversed from the direction assumed for the clear state, or using a multiaperture core with an input aperture in the toroid ring, or using holding windings which pass through the transmit apertures $10T_1$ and $10T_2$ and which are excited while the winding 12 is excited in a manner to oppose a set drive on the winding 12 whereby the result will be as described. The way for securing the desired flux distribution for the set state, which is shown in the drawings, is therefore to be considered as exemplary and not as a limitation on the invention. In any event, it is interesting to note that the flux states of the inner legs of apertures $10T_1$ and $10T_2$ have been reversed.

Next, assume that a first prime winding 14 is threaded through the aperture $10T_1$ and a second prime winding 16 is threaded through the aperture $10T_2$. Assume, further, that the winding 14 has been excited with a priming drive current in the direction of the arrows shown thereon, such that the flux around the aperture $10T_1$ reverses and appears to circulate in a counterclockwise direction instead of in a clockwise direction, as in the set state previously described. The drive applied to the winding 14 is insufficient to affect the core if the core was in the clear state.

Next, assume that through each transmit aperture $10T_1$, $10T_2$, respectively, there is coupled a transfer or output winding 18, 20 of resistance R, linking the main aperture of a receiving core. When winding 14 is excited with priming drive, current in the transfer winding is in a direction tending to clear the receiving core. The receiving core, however, is already in the clear state, and hence the energy due to the reversal of transmitter flux by the priming drive is dissipated in the winding resistance R.

Assume now that a drive winding 22 is coupled to the main aperture of the core 10. Upon the application of a current to the drive winding 20 sufficient to restore the core 10 to its clear state, all the flux in the core will again circulate in a clockwise direction. It should be noted, however, that the primed aperture $10T_1$ has flux in the leg of the material between the aperture and the outer surface of the core, known as the "outer leg," driven from a counterclockwise to a clockwise direction. This results in a current being induced in the output winding 18 in a direction to set the receiving core. However, the flux in the outer leg of the aperture $10T_2$, which was not primed, remains in the clockwise direction as before, and thus the drive of the core 10 to its clear state does not result in a voltage being induced in the winding 20. Consequently, no effect is had upon any load coupled to the winding 20 when the clear drive is applied to the winding 22.

Figure 2:
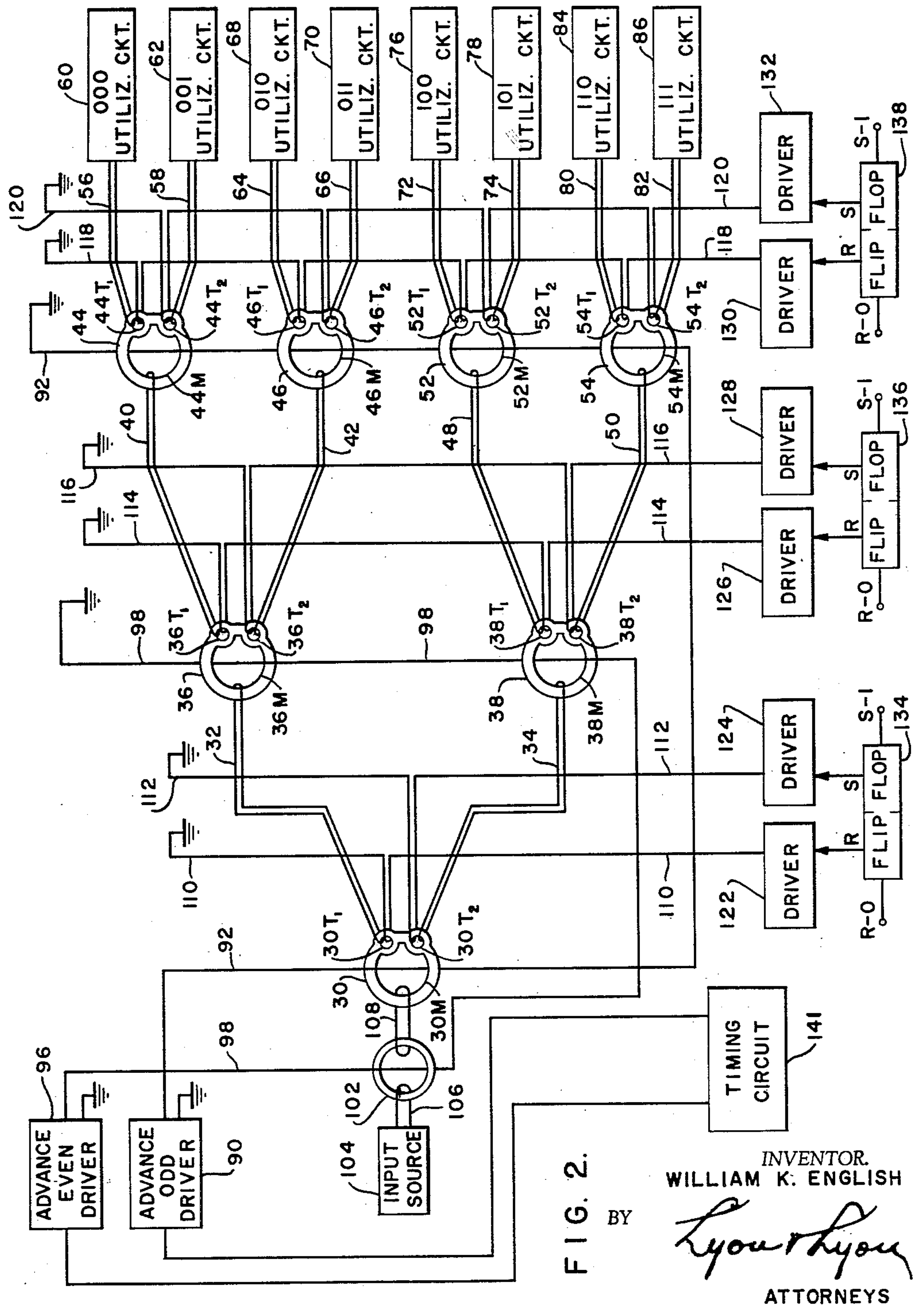
FIGURE 2 is a schematic drawing of an embodiment of this invention.

Attention is now called to FIGURE 2 of the drawings, which is a schematic diagram of the embodiment of the invention. There is shown by way of example here a binary decoding tree capable of indicating by an output on one of eight output windings what code pattern was applied to its three inputs. It should be appreciated that this is not to be construed as a limitation upon the invention, but merely exemplary of its capabilities.

The actual decoding tree includes a first core 30 having a main or input aperture 30M and two transmit apertures $30T_1$ and $30T_2$, each one of these transmit apertures being coupled by means of a transfer winding, respectively 32 and 34, to the main or input aperture 36M, 38M of two succeeding cores 36, 38. Similarly, core 36 has its two transmit apertures $36T_1$ and $36T_2$ coupled by means of transfer windings, respectively 40, 42, to the main apertures 44M, 46M of cores 44 and 46. Also similarly, core 38 has its transmit apertures $38T_1$ and $38T_2$ coupled by means of transfer windings 48, 50 to the respective main apertures 52M, 54M of cores 52, 54.

The transmit apertures of core 44 are respectively connected to drive output windings 56, 58; the output windings are coupled to utilization circuits, respectively 60, 62. These may be other cores or loads of any desired type. The transmit apertures of core 46 are respectively coupled to output windings 64, 66, which in turn drive the respective utilization circuits 68, 70. The transmit apertures of core 52 are coupled to drive transfer windings 72, 74, which in turn drive the utilization circuits 76, 78, respectively. The transmit apertures of core 54 respectively drive transfer windings 80, 82, which in turn drive the respective utilization circuits 84, 86.

It will be seen that effectively there are three groups of cores in the decoder, a first group comprising the core 30, the second group the cores 36, 38, and the third group the cores 44, 46, 52, 54. These core groups may be divided into odd and even core groups. An advance odd driver circuit 90 applies drive currents to all the cores in each of the odd-numbered groups to drive them to their clear states. To accomplish this, the advance odd driver circuit 90 applies current to a drive or advance winding 92, which is first coupled to the main aperture of core 30, and thereafter is coupled to all the main apertures of the cores 44, 46, 52, and 54. An advance even driver current source 96 applies current to a drive or advance winding 98. The winding 98 is coupled to the cores 102, 36, and 38 through their main apertures.

The core 102 is an input core. When it is desired to utilize the embodiment of the invention, then an input source 104 applies a driving current pulse to a winding 106, which is coupled to core 102 through its aperture. This drives the core to its set condition. The winding 98, when energized, drives the core 102 to its clear condition. In doing this, a voltage is induced on input winding 108. This causes a current flow through the winding 108, which is coupled to the main or input aperture of the core 30, which drives the core to the set state of magnetic remanence, which is exemplified in FIGURE 1 of the drawing.

There is provided for each group of cores two priming windings, respectively 110, 112, for the first group, 114, 116 for the second group, and 118, 120 for the third group. The priming winding 110 is coupled to the transmit aperture $30T_1$ and is driven by a driver circuit 122. The priming winding 112 is coupled to apply a priming drive to the aperture $30T_2$ when it receives an output from a driver circuit 124. The priming winding 114 is coupled to apply a priming drive to the apertures $36T_1$ and $38T_1$ when it receives an output from a driver circuit 126. The priming winding 116 is coupled to apply a priming current drive to the apertures $36T_2$ and $38T_2$ when it receives an output from a driver circuit 128. The priming winding 118 applies a priming current drive to the apertures $44T_1$, $46T_1$, $52T_1$, and $54T_1$ when it receives an output from the driver circuit 130. The priming winding 120 applies a priming current drive to apertures $44T_2$, $46T_2$, $52T_2$, and $54T_2$ when this winding is driven by the output from driver circuit 132.

Three flip-flops, respectively 134, 136, and 138, are employed to actuate these driver circuits in accordance with the data desired to be decoded or the load-selecting information which is applied to the inputs. After the flip-flops are driven to their code-representative states, a timing circuit 140 is employed to properly time the operation of the advance odd driver circuit 90 and advance even driver circuit 96. The "pattern" of conduction and nonconduction of the driver circuits 122 through 132 is determined by the flip-flop circuit code-representative states. The priming winding drives affect only the core which is in its set state. The other cores remain unaffected.

To illustrate the operation of the embodiment of the invention shown in FIGURE 2, let it be assumed that each one of the flip-flop circuits 134, 136, and 138, when driven to its reset state, represents a binary zero and when driven to its set state represents a binary one. These flip-flop circuits can be driven to either of their stable states in response to a code which may be read from any suitable source, such as punched paper tape or magnetic tape media or from the output of a shift register.

Assume, by way of example, that flip-flop 134 is driven to its one state, flip-flop 136 to its one state, and flip-flop 138 to its zero state. As a result, driver circuit 124 applies current to priming winding 112, driver circuit 128 applies current to priming winding 116, and driver circuit 130 applies current to priming winding 118. The input source 104 is instructed to drive the magnetic core 102 to its set state. The timing circuit 141 is then actuated. The advance even driver circuit 96 is first actuated by the timing circuit whereupon the advance winding 98 has current applied thereto to drive the cores to which it is coupled to their clear states. In being thus driven, core 102 induces a voltage in the winding 108, which results in driving the core 30 to its set state.

Since only driver circuit 124 is enabled, priming winding 112 carries priming current, whereby the magnetic material around the transmit aperture $30T_2$ of core 30 is driven to its prime state, as shown in FIGURE 1. Thereafter, the advance odd driver 90 is excited. This applies a current to the advancing winding 92, which drives the cores to which it is coupled to the clear states. As a result, the core 30 is driven to its clear state, which results in inducing a voltage in the transfer winding 34.

The current resulting from the voltage induced in transfer winding 34 sets core 38. Since the flip-flop 136 has enabled only driver circuit 128, the priming winding 116 will prime the magnetic material around aperture $38T_2$.

Next the timing circuit 141 will signal the advance even driver circuit 96 to be energized. This supplies a clearing current to the winding 98, whereby the core 38 is driven to its clear state. As a result a voltage is induced in the transfer winding 50 which causes a current to flow therein and drives the core 54 to its set state. Since flip-flop 138 has only enabled driver circuit 130, then, for the particular group, only the priming winding 118 is energized. This results in the magnetic material around the aperture $54T_1$ being primed.

The timing circuit then energizes the advance odd driver circuit 90, in response to which a voltage is induced in the output winding 80 when core 54 is driven to its clear condition. The output winding 80 is coupled to the utilization circuit 84. If the binary number 110 is represented by the settings of the flip-flops, respectively 134, 136, 138, then an output-on-output winding 80 is indicative of the fact that the code pattern with which the flip-flops were set represented 110. It can be similarly shown that each different output winding 56, 58, 64, 66, 72, 74, 80, 82 each has a unique output representative of a different one of the code patterns which are employed to energize the inputs, here represented by flip-flop circuits 134, 136, 138. The timing circuit 141 may be any one of known timing circuits employed in the electronic field, such as a binary counter. Circuits for applying drives to magnetic cores, here designated as the advance odd driver circuit 90 and the advance even driver circuit 96, are also well known in the art and will not be described in detail herein. The input source 104 and auxiliary core 102 are shown as exemplifying an arrangement for driving the core 30 to its partially set condition. It should be understood that this is by way of exemplification and not to be considered as binding or limiting on the invention. The priming drive applied to a group of cores can follow an advancing drive applied to a preceding group of cores, or can be applied to a group of cores when a preceding group of cores has the advancing drive applied thereto, provided that the priming drive lasts longer than said clear drive, or a direct-current priming drive may be used as shown in FIGURE 2 and just described.

Figure 3:
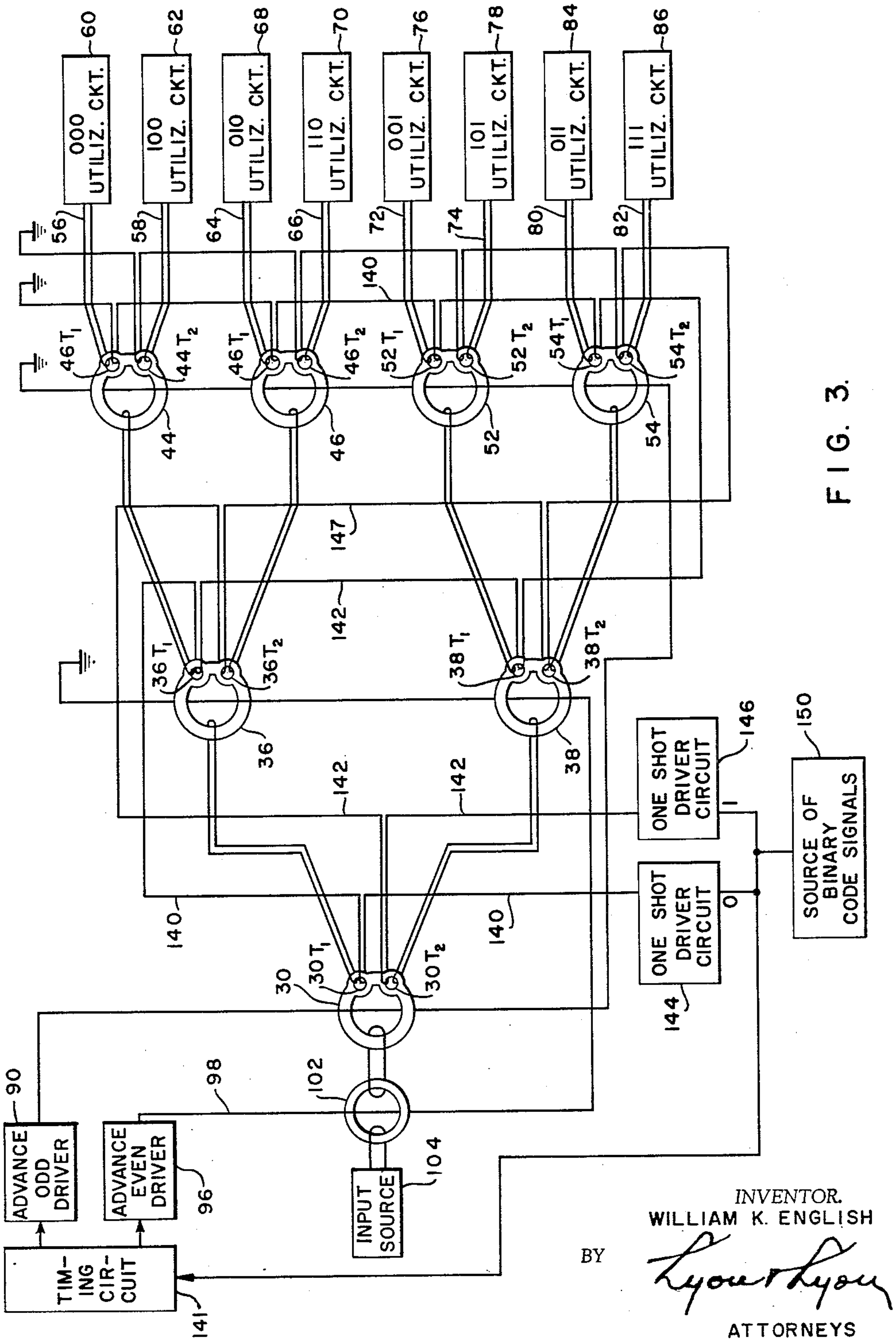
FIGURE 3 is a schematic drawing of another embodiment of this invention.

The selective priming feature of this invention allows a single multiaperture core to act in a manner similar to a relay transfer contact, with the added feature that information may be stored in each core. Clearly, the cores may be connected together to form a binary decoding tree (or a "one-load-out-of-many" load selector) exactly analogous to a relay decoding tree. However, the added capability of information storage in each element of the array allows serial decoding of binary data. As indicated in FIGURE 3, this is accomplished by using the same two priming windings for all elements in a core group, one priming winding extending through one aperture of each element, and the remaining priming winding through the other aperture of each element. The state of remanence of the first core in the first group progresses through the array of cores as the clear and priming windings are energized in the proper sequence.

FIGURE 2 illustrates an arrangement of the embodiment of the invention suitable for parallel data entry into the decoding arrangement. FIGURE 3 is a circuit diagram of another embodiment of the invention which can handle data in serial form. The magnetic cores and their interconnecting windings with the exception of the priming windings are identical with those shown in FIGURE 2, and thus bear identical reference numerals. Instead of having a pair of priming windings for each group of cores, in FIGURE 3 a pair of priming windings, respectively 140, 142, is provided for all the core groups. One priming winding 140 is coupled to all the upper (or zero) transmit apertures, respectively $30T_1$, $36T_1$, $38T_1$, $44T_1$, $46T_1$, $52T_1$, $54T_1$. The other priming winding 142 is coupled to all the lower (or one) transmit apertures, respectively $30T_2$, $36T_2$, $38T_2$, $44T_2$, $46T_2$, $52T_2$, $54T_2$.

Each priming winding 140, 142 is driven by the respective one-shot priming circuits 144, 146. One-shot driver circuit 144 applies a priming current to the priming winding 140 when it receives a zero binary signal from the source of code signals 150. One-shot driver 156 applies a priming current to the priming winding 142 when it receives a "one" binary signal from the signal source 150.

Consider, now, that the binary number 110, which was used to illustrate the operation of the embodiment of the invention in FIGURE 2, exists in serial form. The first binary bit actuates one-shot circuit 146 and also timing circuit 141, which is actuated each time it receives a one or a zero binary bit signal. The timing circuit causes the advance even driver circuit to 96 to clear core 102, which had been previously driven to its set state from the input source 104. As a result, core 30 is driven to its set state. Priming winding 142 is excited by the one-shot circuit 146 for a longer interval than the application of the set drive to core 30, hence aperture $30T_2$ of core 30 is primed.

The next binary-bit signal, which is a "one" signal, again energizes the timing circuit. This time the advance odd driver 90 is energized by the timing circuit, whereby core 30 is driven to its clear state, in response to which core 38 is driven to its set state. The drive applied to priming winding 142 primes aperture $38T_2$.

The next or zero binary-bit signal causes the advance even driver circuit 96 to be energized, whereby core 38 is driven to its clear state, followed by core 54 being driven to its set state. One-shot driver 144, which is also energized by the zero bit signal, drives priming winding 140, whereby aperture $54T_1$ is primed. The timing circuit is enabled to energize the advance odd driver circuit after receiving the last binary-bit signal, whereby core 54 is driven to its clear state and an output signal is applied to output winding 80.

It will be seen that the embodiment of the invention shown in FIGURE 3 will decode or select a single output of many, in response to a serial code input. The only precaution required in its operation is that both priming windings should not be energized simultaneously or in a manner to prime both transmit apertures of a core. This may be easily avoided, however, if a previous priming signal is terminated before an advancing drive is applied and a new priming signal is applied, either simultaneously with or after the next advancing drive is applied.

The decoding arrangements in accordance with this invention may also be used for sequence detection, since a sequence detector simply is a special case of a general decoding tree with a single chain of elements selected from the tree for the particular sequence desired.

Selective priming is not necessarily limited to two apertures. In fact, a multiapertured device is analogous to a selector switch with as many positions as there are apertures. This feature permits the use of these multiaperture devices in Lupanov decoding trees and other arrangements employing more than binary selection at each level of the tree, with a considerable reduction in the number of elements required. Accordingly, this invention is not to be construed as being limited to the use of a multiaperture core with only two apertures employed for selective priming.

There has accordingly been described and shown herein a novel and useful arrangement for decoding or selective switching which employs multiaperture magnetic cores and wire.

I claim:

1. Apparatus for selecting one of many outputs in response to a predetermined code comprising a plurality of multiaperture magnetic cores each of said cores having a plurality of transmit apertures and each being made of a material having a first and second state of magnetic remanence, said plurality of cores being arranged in successive groups where the number of cores in each group bears a definite predetermined relationship to the number of cores in a preceding group, means coupling the transmit apertures of each of the cores in one group to a predetermined number of cores in a succeeding group, means for establishing a magnetic core in a first of said successive groups in its first state of magnetic remanence, means for applying priming current to one of the transmit apertures of a core in each group in accordance with said predetermined code, means for applying drives successively to said successive groups of cores to drive them toward their second states of magnetic remanence whereby the first state of magnetic remanence is transferred successively from a magnetic core in the first of said successive groups to a different core in each of said groups as determined by the primed transmit apertures, and means for deriving an output from the primed transmit aperture of a magnetic core in the last of said groups.

2. A decoding structure comprising a plurality of multiaperture magnetic cores each of said cores being made of a material having a first and a second state of magnetic remanence and having an input aperture and a first and a second transmit aperture, said plurality of cores being arranged in successive groups where the number of cores in each group is twice the number of cores in a preceding group, a plurality of transfer windings, a different two of said plurality of transfer windings respectively coupling the transmit apertures of a core in one group to the input apertures of two cores in a succeeding group, first and second priming winding means, said first and second priming winding means being respectively coupled to the respective first and second transmit apertures of all the cores in a different one of said groups, a plurality of output windings, a different one of said output windings being coupled to a different one of the transmit apertures in the cores in the last of said groups, means for driving the core in the group having one core to its first state of magnetic remanence, means for applying drives successively to successive groups of cores to drive them toward their second states of magnetic remanence, and means for successively exciting in accordance with a predetermined code pattern said first and second priming winding means for priming the material about one of the transmit apertures of a core in each group which is driven to its first state of magnetic remanence in response to the application of a drive by said means for applying drives to a preceding group of cores, whereby an output is derived on one of said output windings in accordance with said predetermined code pattern.

3. A decoding structure as recited in claim 2 wherein said first and second priming winding means comprises a plurality of first and second priming windings, a separate first and second priming winding being provided for each group of cores, said first priming winding in each group being inductively coupled to each core in the group through its first transmit aperture, and said second priming winding in each group being inductively coupled to each core in the group through its second transmit aperture.

4. A decoding structure as recited in claim 2 wherein said first and second priming winding means comprises a first and a second priming winding, said first priming winding being inductively coupled to all the plurality of multiaperture cores through their first transmit apertures, said second priming winding being inductively coupled to all the plurality of multiaperture cores through their second transmit apertures.

5. A decoding structure comprising a plurality of multiaperture magnetic cores, each of said cores being made of a material having two states of magnetic remanence and having an input aperture and a first and a second transmit aperture, a first transfer winding coupling the first transmit aperture of one of said plurality of magnetic cores to the input aperture of a second of said plurality of magnetic cores, a second transfer winding coupling the second transmit aperture of said one magnetic core to the input aperture of a third of said plurality of magnetic cores, a first advancing winding coupled to the input aperture of said one of said magnetic cores, a second advancing winding coupled to the input apertures of said second and third of said magnetic cores, means for driving said one magnetic core into one of its two states of magnetic remanence, means for selectively priming the material around one of the transmit apertures of said one magnetic core in accordance with a predetermined code pattern, means for exciting said first advancing winding to transfer the state of magnetic remanence of said one core to the one of said second and third cores coupled to the transmit aperture about which the material has been primed, means for selectively priming the material around one of the transmit apertures of said second and third cores in accordance with a predetermined code pattern, first, second, third, and fourth output windings respectively coupled to the first and second transmit apertures of said second core and the first and second transmit apertures of said third core, and means for exciting said second advancing winding for obtaining an output on the one of said output windings coupled to the transmit aperture about which the material has been primed.

6. A decoding structure as recited in claim 5 wherein said means for selectively priming the material around one of the transmit apertures of said one magnetic core includes a first and second priming winding respectively coupled to said core through its first and second transmit apertures, said means for selectively priming the material around one of the transmit apertures of said second and third cores comprises a third and fourth priming winding, said third priming winding being inductively coupled to said second and third cores through their first transmit apertures, said fourth priming winding being inductively coupled to said second and third cores through their second transmit apertures.

7. A decoding structure as recited in claim 5 wherein said means for selectively priming the material around one of the transmit apertures of said one magnetic core, and said means for selectively priming the material around one of the transmit apertures of said second and third magnetic cores comprises a first priming winding and a second priming winding, said first priming winding being inductively coupled to all the cores through their first transmit apertures, said second priming winding being inductively coupled to all the cores through their second transmit apertures.

8. In an apparatus for selecting one of many outputs, a selective element comprising a multiaperture magnetic core made of material in which magnetic flux can circulate in the same or in opposite directions, said core having an input aperture and a plurality of transmit apertures, driving winding means coupled to said input aperture for driving said magnetic core to cause the magnetic flux around said transmit apertures to circulate in opposite directions, a separate priming winding means for each of said transmit apertures, each of said primary winding means being separately coupled to said core through each of the transmit apertures for selectively driving the material around each of said transmit apertures to cause the magnetic flux therein to circulate in opposite directions which are opposite to those established by said driving winding means whereby to prime a transmit aperture, a separate output winding coupled to a different transmit aperture of said core and means including an advancing winding coupled to said core through its input aperture for driving said core to its state wherein said magnetic flux circulates in the same direction whereupon an output voltage is induced in the output winding coupled to a transmit aperture which has been primed.

9. In a magnetic-core decoding circuit, a first multiaperture magnetic core having a major aperture and a plurality of minor transmitting apertures, a plurality of magnetic cores each having an input aperture and being adapted to receive information from said first core, a plurality of transmitting windings, each threading an input aperture of a respective one of said plurality of cores and one of said plurality of minor transmitting apertures of said first core, advance current means to shift information from said first core to another of said cores, and control means to control the shifting of information from said first core to another core and to prevent shifting to others of said cores, said control means being selectively operable.

References Cited in the file of this patent

UNITED STATES PATENTS

| | | |
|---|---|---|
| 2,853,693 | Lindenblad | Sept. 23, 1958 |
| 2,988,731 | Kam Li | June 13, 1961 |